No. 687,588. Patented Nov. 26, 1901.
E. THOMSON.
STEERING MECHANISM FOR AUTOMOBILES.
(Application filed Mar. 28, 1900.)
(No Model.)
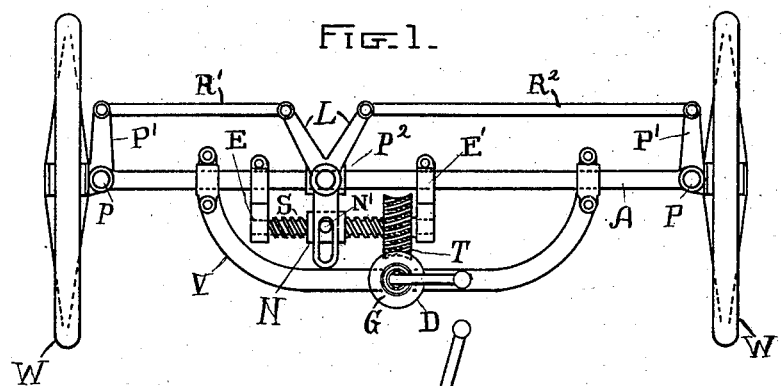
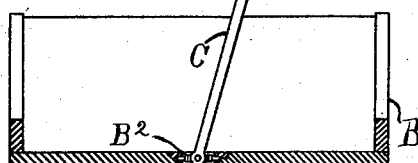
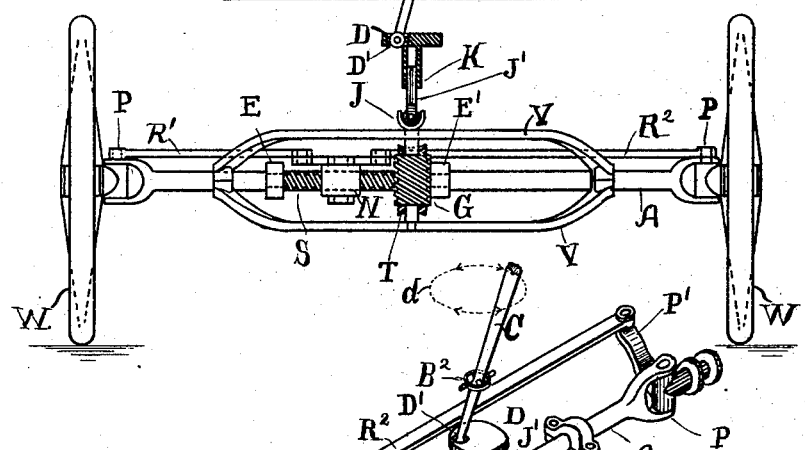
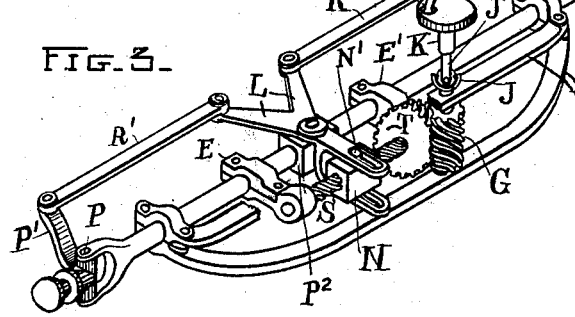
WITNESSES.
Henry O. Westendarp
Benjamin R. Hill
INVENTOR
Elihu Thomson,
by Albert G. Davis,
Atty.

United States Patent Office.

ELIHU THOMSON, OF SWAMPSCOTT, MASSACHUSETTS.

STEERING MECHANISM FOR AUTOMOBILES.

SPECIFICATION forming part of Letters Patent No. 687,588, dated November 26, 1901.

Application filed March 28, 1900. Serial No. 10,437. (No model.)

*To all whom it may concern:*

Be it known that I, ELIHU THOMSON, a citizen of the United States, residing at Swampscott, county of Essex, State of Massachusetts, have invented certain new and useful Improvements in Steering Mechanism for Automobiles, (Case No. 1,604,) of which the following is a specification.

The present invention has for its object to provide a simple and effective mechanism for steering an automobile and one which will interfere as little as possible with persons getting into and out of the vehicle.

In the accompanying drawings is shown an embodiment of my invention, in which—

Figure 1 is a plan view of the steering-wheels of a vehicle. Fig. 2 is a front elevation of a vehicle with certain parts in section, and Fig. 3 is an isometric view of the steering mechanism.

In the drawings, A represents a fixed axle or support, and pivotally secured to the ends thereof are steering-wheels W. These wheels may either be the front or the rear wheels of the vehicle. In the present instance they are shown as being the front wheels. Each wheel is mounted on a short axle pivoted at P, which axle is provided with an extension or lever P'. Rigidly mounted on the fixed axle A is a block $P^2$, forming a bearing for the three-armed lever L. Two of these arms are connected by rods R' $R^2$ with the axle-levers P', while the third arm is forked, Fig. 3, and mounted therein is the block N. Rigidly secured to the fixed axle A are two supports E and E', and mounted in bearings formed therein is a screw S. Mounted for horizontal movement on the screw is a screw-threaded nut or actuator N, which is provided with two projecting pins N', one on the top, the other on the bottom, and these pins work in slots formed in the arms of the fork. Keyed or otherwise secured to the screw is a worm-wheel or spiral gear T, and meshing therewith is a screw or spiral gear G. Rigidly secured to the fixed axle A is a two-part frame V, and mounted in suitable bearings therein is the shaft of the spiral gear G. As the gear G is rotated in one direction or the other rotary motion is communicated to the screw S, and the nut N is moved to the right or left, as the case may be. The nut in moving to and fro imparts motion to the lever L through the pins N', and the steering-wheels W assume a position in accordance therewith.

The gears G and T and screw S are preferably so arranged that when the steering-wheels W strike an obstruction in the road no shock will be transmitted to the steering-handle. The gears may be so arranged that one, two, or even more turns of the gear G are required to move the steering-wheels from their central to their extreme deflected position. By suitably arranging the gearing the amount of power required to steer the vehicle may be anything desired.

The parts are preferably so arranged that a right-hand rotation of the gear G will steer the vehicle to the right and a left-hand rotation to the left.

Located above the steering-wheels and frame is a vehicle-body B, which may or may not be spring-supported. Mounted in a gimbal or universal joint $B^2$, which is supported by the floor of the body, is the steering handle or lever C. This handle extends downwardly below the floor of the vehicle and is pivotally connected to the steering mechanism. The path of the handle in swinging around the joint $B^2$ will be that of an inverted cone, the said joint forming the apex, while the dotted line $d$ represents the path of travel at a point above the center of movement. If the body is mounted on the frame without interposed springs and the wheel-tires used for the purpose of cushioning, a direct connection may be made between the handle and the gear G, but when the body is spring-supported means must be provided for compensating for the movement of the body independent of the frame. In carrying out this feature of my invention I divide the shaft which carries the gear G into two parts, and between the parts is a gimbal or universal joint J. The lower end of the handle C is pivotally connected to a disk D, and extending downwardly from the disk is a sleeve K, which is splined on the upper end J' of the gear-shaft, the sleeve and shaft uniting to form an extensible connection. The center line of the gear and that of the joint $B^2$ are coincident, and by changing the distance between the pivot D' and the center line the diameter of the base of the cone described by the end of the handle will be changed, and the leverage will also be changed. The distance between the disk D and the pivot B² will also determine the diameter of the base of the conical path traversed by the handle C. As the vehicle-body moves up and down, or twists to the right or left, or combines a vertical with a twisting movement, the disk D will move up and down to greater or less extent and compensate for said movement. The sleeve K being a part of the disk and splined on the shaft J', a rotary movement of the handle and disk will impart rotary movement to the gear G, which in turn will move the steering-wheels.

The handle C may be so connected and arranged that it will occupy, when the steering-wheels are in their central position, any given point in the path of travel; but for convenience I prefer to have the handle occupy a central position either forward or back. By this arrangement the handle can be moved out of the way of the person entering or leaving the vehicle. The leverage of the handle C should be great enough to enable the operator to move the wheels when the vehicle is stationary so that the handle may be moved to a point farthest removed from the operator to permit him to freely enter and leave the vehicle.

The operation of my invention is as follows: The operator desiring to steer the vehicle to the right rotates the handle C to the right, which handle describes in its movement an inverted cone. The path of the lower end of the handle will be that of an irregular cone, with the disk D forming the base and the gimbal-joint B² the apex. The disk D rotating in a right-hand direction rotates the gears G and T, and the nut N moves toward the left. This nut in moving actuates the lever L, and the rods R' and R² convey motion to the steering-wheels. To steer the vehicle to the left, the handle C is rotated in the opposite direction.

It is within the scope of my invention to employ any suitable gearing between the handle C and the steering-wheels, the particular feature of my invention being the use of a single handle or lever C, pivotally secured to the body of the vehicle or to a part of the frame in event of no springs being used, which handle or lever has for its path of movement an inverted cone. It will be seen that with this arrangement no pivotal support above the floor of the vehicle is needed and that there is no bent lever or swinging wheel to interfere with the entrance or exit of the operator, but merely a single vertically-extending handle which can be thrown into an extreme position where it is well out of the way.

What I claim as new, and desire to secure by Letters Patent of the United States, is—

1. In a vehicle, the combination of a fixed axle or support, a steering-wheel and its axle secured thereto, a steering-lever pivoted at a point intermediate its ends, and arranged to describe an inverted cone during the act of steering, and to make more than a single revolution in changing the wheel from a central to an extreme position, and a gear between the wheel and the steering-handle.

2. In a vehicle, the combination of a supporting element, a steering-wheel, an axle therefor, a steering-handle which is supported by the said element and describes during the act of steering an inverted cone and is arranged to make more than a single revolution in changing the wheel from a central to an extreme position, gearing between the wheel and the handle, and means whereby said element and axle are permitted to rise and fall with respect to each other without disturbing the relation of the gearing.

3. In a vehicle, the combination of a steering-wheel, a handle which is pivoted at a point between its ends and is arranged to be rotated more than once in moving the steering-wheel from the central to an extreme position, and a mechanical connection between the wheel and the handle which includes a worm-wheel and worm.

4. In a vehicle, the combination of a steering-wheel, a vehicle-body, a steering-handle pivoted to a support carried by the vehicle-body and arranged to describe an inverted cone during the act of steering, a worm or gear directly below the point of pivot, and means for mechanically connecting the handle with the worm or gear and the steering-wheel.

5. In a vehicle, the combination of a pair of steering-wheels, rods connecting the wheel-axles, worm-gearing for moving the rods, a vehicle-body, and a steering-handle which is connected to the steering-wheels through the rods and gearing and is pivotally secured to the vehicle-body at or about the floor thereof and which handle describes in its operation an inverted cone.

6. In a vehicle, the combination of a steering-wheel, a pivoted steering-handle, a support therefor, a gear directly below said pivot and in line therewith, and means for connecting the handle with the gear, which connection is offset from the center line, passing through the pivot and the gear, whereby motion is conveyed from the handle to the steering-wheel, and the path of movement of the steering-handle made to conform to the shape of an inverted cone.

7. In a vehicle, the combination of a steering-wheel, a pivoted lever having a forked end, an actuator connected to the fork, a worm extending parallel with said axle for moving the actuator, a gear for driving the worm, a steering-handle, and a universal connection between the handle and the gear.

8. In a vehicle, the combination of a steering-wheel, a fixed axle, a pivoted lever mounted on the axle, a support mounted on said axle, an actuator mounted on the support, a horizontal worm for moving said actuator, a vertical worm which is connected to the actuator, and a worm-wheel for connecting the worms.

9. In a vehicle, the combination of a steering-wheel, a fixed axle, two pivoted axles mounted thereon and connected by mechanical means, a pivoted lever connected to said means, a support mounted on the axle, gearing mounted on the support and connected to the lever, and an actuating-handle pivoted at a point between its ends and capable of moving in a conical path for actutating the gearing.

10. In a vehicle, the combination of a steering-wheel, a steering-handle arranged to describe a cone, or a portion thereof, during the act of steering, a universal connection between the wheel and the handle, and a means forming a part of the connection which is so arranged that more than a single revolution of the handle is necessary in moving the steering-wheel from a central to an extreme position.

11. In a vehicle, the combination of a steering-wheel, a pivoted steering-handle arranged to describe during the act of steering, an inverted cone, or a portion thereof, a support for the handle, and an extensible connection between the support and the wheel, whereby the latter may move vertically with respect to each other.

12. In a vehicle, the combination of a steering-wheel, a pivoted steering-handle arranged to describe during the act of steering, an inverted cone, or a portion thereof, a support for the handle, an extensible connection between the support and the wheel, whereby they may move vertically with respect to each other, and means for permitting a twisting motion of the support independent of the wheel.

13. In a vehicle, the combination of a steering-wheel, a vehicle-body, a handle pivotally secured to the body at or near the floor and arranged to describe a cone during the act of steering, a gearing for moving the wheel, a shaft and sleeve splined on each other, and a gimbal-joint between the shaft and one of the gears.

14. In a vehicle, the combination of a support, steering-wheels mounted thereon, a steering-handle, a two-part frame rigidly secured to the support, and a gear mounted between the upper and lower parts of the frame for transmitting motion between the steering-handle and the wheels.

15. In a vehicle, the combination of a fixed axle, short axles for the steering-wheels mounted thereon, rods connecting the short axles, a screw extending parallel to the fixed axle, bearings for the screw, a screw-threaded nut mounted on the screw, a forked lever pivotally mounted on the axle which engages with the nut and is connected to the rods, a gear on the screw, and a second gear meshing with the first for imparting movement thereto.

16. In a vehicle, the combination of a steering-wheel, a steering-handle, a gimbal-joint for said handle, whereby it is permitted to describe a cone as it is actuated, gearing connected to the wheel, and a gimbal-joint connection between the handle and the gearing.

In witness whereof I have hereunto set my hand this 24th day of March, 1900.

ELIHU THOMSON.

Witnesses:
   DUGALD MCKILLOP,
   ROBERT SHAND.